United States Patent [19]

Claassen et al.

[11] 4,194,401
[45] Mar. 25, 1980

[54] TRANSDUCER FOR MEASURING THE INTERNAL PRESSURE IN PIPES

[75] Inventors: Peter Claassen; Rudolf Zeiringer; Helmut List, all of Graz, Austria

[73] Assignee: Hans List, Graz, Austria

[21] Appl. No.: 959,213

[22] Filed: Nov. 9, 1978

[30] Foreign Application Priority Data

Nov. 11, 1977 [AT] Austria .................................. 8099/77

[51] Int. Cl.² .............................................. G01L 9/04
[52] U.S. Cl. .................................... 73/730; 73/119 A
[58] Field of Search ...................... 73/730, 119 A, 115

[56] References Cited

U.S. PATENT DOCUMENTS

| | | | |
|---|---|---|---|
| 3,511,088 | 5/1970 | Weaver | 73/119 A |
| 3,603,152 | 9/1971 | Alibert | 73/730 |
| 4,090,404 | 5/1978 | Dupont et al. | 73/119 A |

FOREIGN PATENT DOCUMENTS 2747949 3/1978 Fed. Rep. of Germany ............. 73/730

Primary Examiner—Donald O. Woodiel
Attorney, Agent, or Firm—Watson, Cole, Grindle & Watson

[57] ABSTRACT

A transducer for measuring the internal pressure in pipes, preferably injection pipes of diesel engines by determination of pipe deformations, comprises a rigid housing enclosing the pipe in which the pressure is to be measured, and at least one elastic sensor element arranged inside the housing and adjacent to at least a part of the circumference of the pipe. The sensor element and the housing are detachably mounted on the pipe and between the housing and the sensor element there is arranged an endorsing element elastically forcing the sensor element against the pipe whereby deformations of the pipe are transmitted frictionally to the sensor element.

12 Claims, 2 Drawing Figures

TRANSDUCER FOR MEASURING THE INTERNAL PRESSURE IN PIPES

BACKGROUND OF THE INVENTION

This invention relates to a transducer for measuring the internal pressure in pipes by determination of pipe deformations, preferably deformations in injection pipes of diesel engines, comprising a rigid housing enclosing the pipe to be measured, and at least one elastic sensor element arranged inside the housing and adjacent to at least a part of the circumference of the pipe.

DESCRIPTION OF THE PRIOR ART

Efforts to clean exhaust gases generated by internal combustion engines and attempts to improve fuel economy have resulted in demands for precise diagnosis systems for the injection units of diesel engines, especially within the last few years. For this reason, the development of means for the exact checking of the injection timing and means for injection control, respectively, have turned out to be most important. Until now, pressure transducers used for measuring the internal pressure in injection pipes have been limitedd to conventional measuring devices for instance, strain gauges or piezoelectric transducers. The latter devices are mounted in many cases within the injection pipe and are thus directly in contact with the fuel. However, the mounting of such transducers is very timeconsuming and problematical due to the high pressure values within injection pipes. In addition, since the placing of the transducer with the pipe necessitates the opening of the injection pipe, soiling of the injection system and leaking of the system has resulted. Besides this, it is necessary to construct the injection pipes in a manner to enable mounting of the transducer for the measuring process. Also, in some cases transducers permanently resting in the pipe have been utilized, however, this solution is economically not at all feasible.

From German DE-OS 24 40 493 a transducer for measuring the internal pressure in pipes is known which is adapted to be clamped on the pipe. Two piezoelectric discs of quartz are arranged facing each other to serve as sensor elements. Variation of the pipe diameter caused by the inside pressure is transmitted to the quartz discs by means of metallic interposition members. According to the piezoelectric principle, electric charges can be taken off from the surfaces of the quartz discs an processed. This known construction is afflicted with essential disadvantages. Due to the fact that variations of the pipe diameter are transformed via the metallic interposition members into pressure on the quartz discs, this system does not distinguish between variations of the pipe diameter caused by pipe bending due to pipe vibrations or diameter variations caused by internal pressure acting upon the pipe. However, this is a very important distinction because, especially with diesel engines, injection pipe vibrations are not avoidable and can considerably falsify the measuring signal. Injection pipes are very thick-walled and therefore the pipe is only slightly extended under internal pressure. Therefore, with the presence of relatively large forces caused by mass acceleration, it is very difficult to carry out an undisturbed and faultless measurement of the very small pipe extension.

Another transducer is described in German DE-OS 25 29 563. The transducer comprises a rigid housing enclosing the pipe to be measured, and an elastic sensor element adjoining at least at a part of the pipe circumference. For determination of the pipe diameter variation, a strain gauge, which is adhered to the pipe, is utilized as a sensor element which is not detachable and then applicable again. Also, the very heavy transducer housing is fixed on the pipe by means of an adhesive. Thereby, also, the two halves of the housing are connected together and mounting of the transducer is complicated. The desired economic re-use of the transducer on different pipes is not possible. The transducer has to remain on the pipe even when no measurement is untertaken. To remove the transducer from the pipe, in most cases, the transducer has to be destroyed. Besides the mentioned disadvantages, further technical problems may arise, as the heavy mass of the transducer housing is subject to strong acceleration forces caused by unavoidable pipe vibrations. These forces may deform the injection pipes and cause failure of the injection system. The strain gauge attached to the pipe would be ready for measurement already without a housing. The housing enclosing the strain gauge serves as a protective cover for the strain gauge and the connecting wires. The epoxy resin filled into the hollow space between the housing and the pipe with the sensor element serves as a further protection for the strain gauge surface and mainly also to support the connecting wires leading away from the sensor element. Otherwise, the danger of rupture of the wires arises due to the unavoidable vibrations of the injection pipes of diesel engines.

It is the aim of the invention to provide a transducer of the kind referred to which avoids the afore-mentioned disadvantages of the known transducers, which can be attached to and removed from the pipe to be measured in a simple and quick way, and which may be re-used. The transducer should be able to compensate for measuring signals which are not generated by variations of the internal pipe pressure but by other pipe deformations, for instance, due ti pipe bending, or to separate such measuring signals from the actually desired signals. Futhermore, the transducer should be usable also on pipes which are subject to strong vibrations and therefore would cause high acceleration forces on the transducer.

SUMMARY OF THE INVENTION

According to the invention this aim is achieved in a sensor element and housing which are detachably mounted on the pipe when an endorsing element is positioned between the housing and the sensor element, the endorsing element elastically forcing the sensor element against the pipe. The deformations of the pipe are transmitted frictionally to the sensor element. Preferably, the transducer housing is made of two parts. The main advantage of this invention is that the disturbing influence on the sensor element due to mass forces caused by pipe vibrations is avoided by the arrangement of the elastic endorsing element forcing the foil-like sensor element against the pipe surface. Preferably, the endorsing element, which itself is supported by the transducer housing, is of an annular shape and presses the sensor element against the pipe surface in a manner that, due to the generated friction, any vibration of the pipe surface is exactly transmitted to the sensor element.

Even in the case that an interposition layer between the pipe surface and the sensor element is used to protect the latter, frictional engagement of the sensor element can be ensured. The interposition layer may also be of a friction increasing material. Unavoidable relative movements between the transducer housing and the pipe caused by mass forces due to pipe vibrations are absorbed by the elastic and (preferably) annular endorsing element and therefore have almost no influence on the pressing forces upon the sensor element. It is a special advantage that it is not the variation in the pipe diameter, but variation of the length of the pipe circumference which is determined by the device according to the invention.

In this respect, the use of piezoelectric foils as a sensor element is especially advantageous because a measuring signal due to the variation of length and a signal due to variation of thickness of the lengthened foil is generated when the crystallographical axes of the piezoelectric foil are chosen in a suitable manner. This results in a certain amplification effect of the measuring signal.

Furthermore, by suitable arrangement of the crystallographical axes of the piezoelectric foil, it is also possible to determine only variations of length perpendicular to the pipe axis and not variations of length in the direction of the pipe axis due to pipe bending. Similar advantageous effects can be obtained when using capacitive measuring foils. Furthermore, with strain gauges as sensor elements an arrangement is possible which prevents determination of variations of length in the direction of the pipe axis and falsification of the measuring result.

According to another embodiment of the invention in which the transducer housing is made of at least two parts and is attachable to the pipe, each of the housing parts may be provided with at least one sensor element and an endorsing element. This ensures advantageously simple and time-saving mounting of the transducer and it is possible to easily change single defective sensor or endorsing elements or sensor and endorsing elements together.

According to a further embodiment of the invention the transducer is provided with a number of sensor elements which are arranged facing each other, preferably in couples, on the circumference of the pipe, so that with the occurrence of pipe bending one sensor element of a couple is stretched and the other is compressed, thereby generating measuring signals of the same size, but of different signs, which may be compensated for electrically. By this arrangement signals generated by enlargement of the pipe surface due to internal pressure are amplified, and disturbing signals generated by pipe bending due to pipe vibrations are compensated for.

According to further development of the invention the transducer housing is bipartite and the two housing parts are movably linked on one side, for instance by a hinge, and clamping of the transducer on the pipe is made by means of a chucking device. The chucking device may comprise, for instance, a chucking screw, a snapping catch, or a spring clip. By these means very quick and simple mounting of the transducer on a pipe to be measured is ensured.

According to a further feature of the invention each of the sensor elements or the units consisting of a sensor and an endorsing element may be arranged inside the transducer housing in a manner to enable easy detachment and exchanging of each element or unit, respectively. By this arrangement the possibility of simple and cost-saving exchange of single defective sensor elements and/or endorsing elements is obtained.

DESCRIPTION OF THE DRAWINGS

The invention will be hereinafter more specifically explained with reference to an exemplary embodiment depicted in the accompanying drawing wherein.

DESCRIPTION OF THE PREFERRED EMBODIMENT

Figure 1:
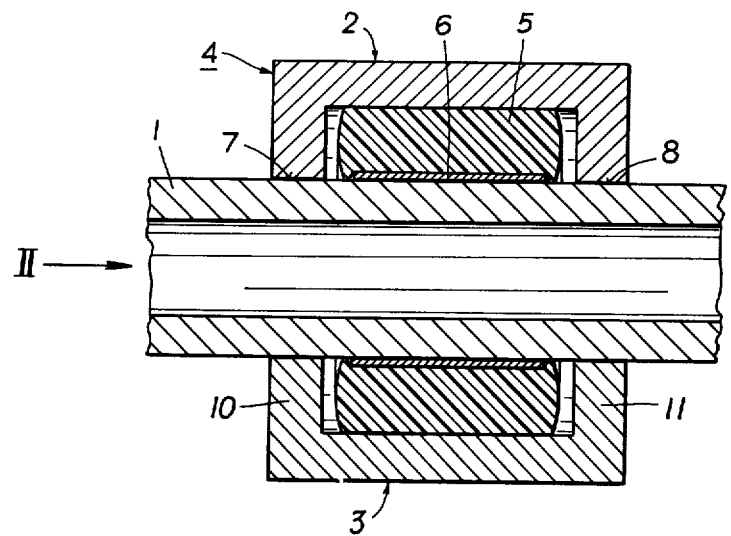
FIG. 1 is a cross section of a transducer according to the invention along line I—I of FIG. 2.

The pipe 1 to be measured is enclosed by an annular transducer housing 4 consisting of two parts 2 and 3. Between the pipe 1 and the inside wall of the housing 4 an elastic endorsing element 5 is arranged which forces a foillike sensor element 6 against the pipe 1. Between the sensor element and the pipe an elastic interposition layer may be located to protect the sensor element. The pressing forces upon the sensor element have to be strong enough to ensure frictional engagement between the sensor element and the pipe, even when using an interposition layer. With the occurrence of variation of the pipe, backlash must be safely avoided. As sensor elements, foils may be used which change their electrical properties when subject to pressure or stress. As an example, a strain gauge may be utilized which is pressed against the pipe circumference. Variations of the length of the pipe circumference are transmitted to the measuring wire inside the foils whereby the ohmic resistance of the wire is changed. This change or resistance is proportional to the change of the length of the pipe circumference.

It is also possible to use piezoelectric foils as a sensor element. According to the known piezoelectric principle, charges are generated on the surface of the sensor element when exerting stress or pressure on them which may be processed in a suitable manner.

It is further possible to utilize foils basing on the capacitive measuring principle. The foil consists of at least three layers: two electrode layers and and one elastic insulation layer between them. Together they form a capacitor. As the one electrode, the pipe to be measured may be used. Variations of the pipe circumference cause variations of the distance between the elctrodes thereby changing the capacity of the capacitor.

The housing 4 of the transducer is designed for high rigidity. It is laterally extending to the pipe 1 so that by means of the chuck device 9 over the annular seating surfaces 7, 8 rigid fixing of the transducer is possible. The sensor element itself therefore is freed from any holding forces. Simuitaneously, the side walls 10, 11 of the housing 4 represent a protective cover for the sensor element 6 and the endorsing element 5.

Figure 2:
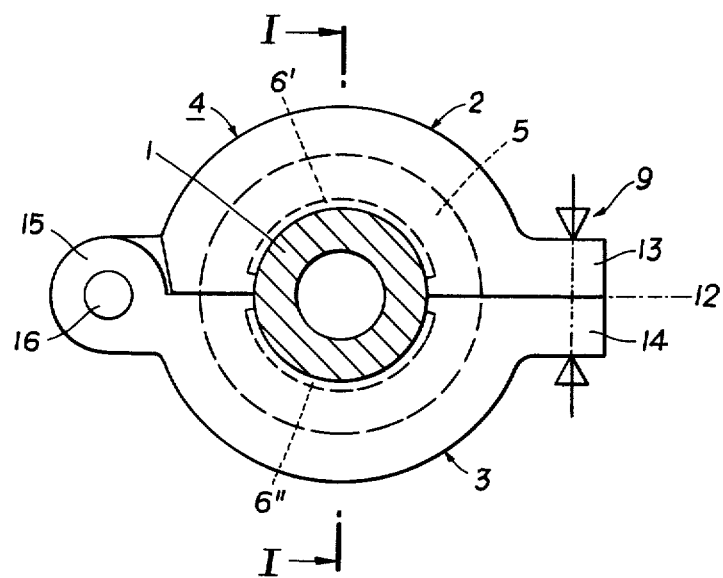
FIG. 2 is a plan view along arrow II of FIG. 1.

As can be seen in FIG. 2 the transducer may comprise two sensor elements 6', 6" which are arranged symmetrically to the dividing plane 12 of the housing 4. The housing parts 2, 3 are on both sides provided with flanges 13, 14 by which the two parts are connected by means of a not sh )wn chucking device 9. The chucking device may comprise a chucking screw, a snapping catch, a spring clip, or the like. A very advantageous embodiment is obtained when, as shown in FIG. 2, on one side of the housing 4 the flanges are designed as a hinge to enable pivoted movement of the housing parts 2, 3 about the axis 16 and clapping on the pipe 1. The annular elastic endorsing element 5 may be of one piece with a joint. Thus it can be clamped on the pipe 1 before mounting the transducer. It may also be bipartite, the two halves preferably resting in the two housing parts where they may be fixed for instance by an adhesive. The sensor element 6 or the sensor elements 6', 6", respectively, are attached to the endorsing element 5 or the two halves of the endorsing element, respectively.

We claim:

1. A transducer device for measuring the internal pressure in a pipe by detecting deformations in the outer surface thereof, such as an injection pipe feeding fuel to a diesel engine, comprising a rigid housing for enclosing the pipe whose outer surface deformation is to be measured, and at least one elastic sensor element having a surface capable of contact with the outer surface of said enclosed pipe, said sensor element being capable of stretching due to deformation of said pipe due to frictional contact therewith, said sensor element being located inside said housing and adjacent to at least a part of the outer surface of the pipe, means for fixedly mounting said rigid housing on the pipe such that said sensor element can contact the outer surface of said enclosed pipe, and an elastic endorsing element positioned between the rigid housing and the sensor element for elastically forcing the sensor element against the outer surface of the enclosed pipe, the deformation of the pipe resulting from pressures therein being transmitted frictionally to the sensor element.

2. A transducer device according to claim 12 wherein said rigid housing is made of two parts.

3. A transducer device according to claim 2 wherein the housing is bipartite and the two housing parts are movably linked on one side by a hinge, and clamping of the transducer on the pipe is made by means of a chucking device.

4. A transducer according to claim 3 wherein the chucking device comprises a chucking screw.

5. A transducer according to claim 3 wherein the chucking device comprises a snapping catch.

6. A transducer according to claim 6 wherein the chucking device comprises a spring clip.

7. A transducer device according to claim 1 wherein a friction increasing interposition layer is positioned against said sensor element on the side opposite the side in contact with said elastic endorsing element so as to be located between said sensor element and the outer surface of the pipe.

8. A transducer device according to claim 1, the housing being made of at least two parts and attachable to the pipe, wherein each of the housing parts is provided with at least a sensor element and an endorsing element.

9. A transducer device according to claim 1 including a number of sensor elements, wherein the sensor elements are arranged facing each other, preferably in couples with respect to the circumference of the pipe enclosed by said transducer device, so that with the occurrence of pipe bending, one sensor element of a couple will be stretched and the other will be compressed, thereby generating measuring signals of the same size, but of different signs, which may be compensated for electrically.

10. A transducer according to claim 1 wherein each sensor element is attached to the housing in a manner to ensure simple detachment and exchanging.

11. A transducer according to claim 1 wherein each sensor and endorsing element is connected to each other, and each unit of a sensor and an endorsing element is attached to the housing in a manner to ensure simple detachment and exchanging of the unit.

12. A transducer device according to claim 1 wherein said elastic endorsing element is in direct contact with said sensor element.

* * * * *